(12) United States Patent
Stone et al.

(10) Patent No.: US 11,407,079 B2
(45) Date of Patent: Aug. 9, 2022

(54) MONITORING CONDITION OF DEBURRING MEDIA IN VIBRATION DEBURRING MACHINE

(71) Applicant: Raytheon Company, Waltham, MA (US)

(72) Inventors: Kristen Stone, Townsend, MA (US); Robert R. S. Di Carlo, Boxford, MA (US)

(73) Assignee: Raytheon Company, Waltham, MA (US)

( * ) Notice: Subject to any disclaimer, the term of this patent is extended or adjusted under 35 U.S.C. 154(b) by 337 days.

(21) Appl. No.: 16/816,533

(22) Filed: Mar. 12, 2020

(65) Prior Publication Data

US 2021/0283741 A1    Sep. 16, 2021

(51) Int. Cl.
| | | |
|---|---|---|
| G06T 7/60 | (2017.01) |
| B24B 31/02 | (2006.01) |
| G06N 20/00 | (2019.01) |
| G06K 9/62 | (2022.01) |
| G06T 7/00 | (2017.01) |

(52) U.S. Cl.
CPC .......... B24B 31/02 (2013.01); G06K 9/6253 (2013.01); G06N 20/00 (2019.01); G06T 7/0004 (2013.01); G06T 7/60 (2013.01); G06T 2207/20081 (2013.01)

(58) Field of Classification Search
CPC .... G06K 9/6253; G06N 20/00; G06T 7/0004; G06T 7/60; G06T 2207/20081; B24B 31/06; B24B 31/02

USPC ....... 382/100, 107, 108, 141, 151, 152, 155, 382/170, 181, 190, 203, 216, 224, 254, 382/255, 266, 312
See application file for complete search history.

(56) References Cited

U.S. PATENT DOCUMENTS

| | | | | |
|---|---|---|---|---|
| 10,139,311 | B2* | 11/2018 | Liao | G01M 13/00 |
| 10,814,417 | B2* | 10/2020 | Boccadoro | B23H 1/02 |
| 2009/0192731 | A1* | 7/2009 | De Jesus | G01L 1/24 |
| | | | | 702/42 |
| 2009/0297042 | A1* | 12/2009 | Nair | G01N 21/8806 |
| | | | | 382/141 |

(Continued)

FOREIGN PATENT DOCUMENTS

CN    109590765 A    4/2019

OTHER PUBLICATIONS

International Search Report and Written Opinion of the International Searching Authority dated Jun. 22, 2021 in connection with International Patent Application No. PCT/US2021/070236, 9 pages.

(Continued)

*Primary Examiner* — Sheela C Chawan (57) ABSTRACT

An apparatus includes at least one memory configured to store at least one image of multiple pieces of deburring media used in a vibration deburring machine. The apparatus also includes at least one processor configured to analyze the at least one image to determine a condition of each of the multiple pieces of deburring media and determine an overall condition of the deburring media. The at least one processor is also configured to generate a graphical user interface containing a notification based on at least one of: the conditions of the multiple pieces of deburring media and the overall condition of the deburring media.

20 Claims, 7 Drawing Sheets

(56) References Cited

U.S. PATENT DOCUMENTS

2013/0203320 A1* 8/2013 Ghalambor ............. B24C 1/083
451/2
2016/0091393 A1* 3/2016 Liao ..................... G01M 13/00
702/34

OTHER PUBLICATIONS

Durian et al., "Shape and erosion of pebbles," Physical Review E (Statistical, Nonlinear, and Soft Matter Physics), vol. 75, No. 2, American Physical Society, Feb. 2007, 10 pages.

Sangid et al., "Process characterization of vibrostrengthening and application to fatigue enhancement of aluminum aerospace components—part I. Experimental study of process parameters," International Journal of Advanced Manufacturing Technology, vol. 53, No. 5-8, Aug. 2010, 16 pages.

* cited by examiner

MONITORING CONDITION OF DEBURRING MEDIA IN VIBRATION DEBURRING MACHINE

TECHNICAL FIELD

This disclosure is generally directed to deburring systems. More specifically, this disclosure is directed to monitoring the condition of deburring media in a vibration deburring machine.

BACKGROUND

Metal components and other components often carry burrs after machining operations or other processing operations have been performed. The burrs represent small pieces or raised edges of material that exist on the components after the processing operations have been completed. If the burrs are allowed to remain on the components, the burrs can create various problems, such as injury to personnel, fraying of wiring that rubs against the components, or creation of conductive or other damaging debris. Burrs can be removed from a component during a "deburring" operation, which ideally smooths various surfaces of the component and removes any burrs from the component.

SUMMARY

This disclosure relates to monitoring the condition of deburring media in a vibration deburring machine.

In a first embodiment, an apparatus includes at least one memory configured to store at least one image of multiple pieces of deburring media used in a vibration deburring machine. The apparatus also includes at least one processor configured to analyze the at least one image to determine a condition of each of the multiple pieces of deburring media and determine an overall condition of the deburring media. The at least one processor is also configured to generate a graphical user interface containing a notification based on at least one of: the conditions of the multiple pieces of deburring media and the overall condition of the deburring media.

In a second embodiment, a method includes obtaining at least one image of multiple pieces of deburring media used in a vibration deburring machine. The method also includes analyzing the at least one image to determine a condition of each of the multiple pieces of deburring media and determining an overall condition of the deburring media. In addition, the method includes generating a graphical user interface containing a notification based on at least one of: the conditions of the multiple pieces of deburring media and the overall condition of the deburring media.

In a third embodiment, a non-transitory computer readable medium contains instructions that when executed cause at least one processor to obtain at least one image of multiple pieces of deburring media used in a vibration deburring machine. The medium also contains instructions that when executed cause the at least one processor to analyze the at least one image to determine a condition of each of the multiple pieces of deburring media. The medium further contains instructions that when executed cause the at least one processor to determine an overall condition of the deburring media. In addition, the medium contains instructions that when executed cause the at least one processor to generate a graphical user interface containing a notification based on at least one of: the conditions of the multiple pieces of deburring media and the overall condition of the deburring media.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, metal components and other components often carry burrs after machining operations or other processing operations have been performed, where the burrs represent small pieces or raised edges of material that exist on the components after the processing operations have been completed. Burrs can create various problems, so burrs are typically removed from a component during a "deburring" operation that ideally smooths various surfaces of the component and removes any burrs from the component. In one type of mechanical deburring operation, metal components or other components are placed into a bin or other container of a vibration deburring machine, where the container contains deburring stones (sometimes referred to as deburring pebbles) or other deburring media and water. The container is shaken or otherwise mechanically vibrated or moved using a motor or other actuator of the vibration deburring machine, which causes the deburring media to (among other things) rub against any components in the container. Given adequate time, this removes or substantially smooths any burrs on the components in the vibration deburring machine.

Unfortunately, the deburring stones, deburring pebbles, or other deburring media often wear down or "dull" over time, such as due to their physical contact with each other, the components being deburred, and the container in which the deburring media are used. When the deburring media wear down, it may take more time for a deburring operation to be completed successfully, or a deburring operation may not be completed successfully at all. Often times, a user of a vibration deburring machine needs to manually guess (based on results obtained for components being deburred) if additional deburring media need to be added to the vibration deburring machine, but this is typically inefficient and can lead to waste. For instance, adding additional deburring media too early to a vibration deburring machine may cause unnecessary wear of the additional deburring media, resulting in increased usage of deburring media over time. Adding additional deburring media too late to the vibration deburring machine may cause delays in deburring operations, such as when deburring operations need to occur for longer periods of time in order to be successfully completed.

This disclosure provides various techniques for monitoring the condition of deburring media in a vibration deburring machine. As described in more detail below, one or more images of deburring media from a vibration deburring machine are captured, and the one or more images are analyzed to estimate the condition of the deburring media. Various approaches may be used to analyze the image(s) of the deburring media, such as pattern recognition or machine learning. If the estimated condition of the deburring media indicates that an inadequate amount of suitable deburring media is being used by the vibration deburring machine, one or more corrective actions can occur. As a particular example, if the analysis determines that more than 25% of the deburring media has experienced at least some threshold amount of wear, one or more corrective actions can be triggered. One example type of corrective action can include generating an alarm or other notification, such as a notification that is presented within a graphical user interface used to provide results of the image analysis to one or more users. Other or additional types of corrective actions may also occur, such as initiating a maintenance task for personnel to add additional deburring media to the vibration deburring machine or automatically adding additional deburring media to the vibration deburring machine. Note that additional deburring media can be added to the vibration deburring machine in different ways, such as by being mixed with the current deburring media used in the vibration deburring machine or by replacing the current deburring media used in the vibration deburring machine.

In this way, the deburring media used by a vibration deburring machine can be analyzed repeatedly over time during operation of the vibration deburring machine, and determinations whether additional deburring media should be added to the vibration deburring machine can be made repeatedly over time. Ideally, this can reduce or minimize the amount of deburring media used in the vibration deburring machine over time while still maintaining desired operation of the vibration deburring machine. Moreover, this approach can remove subjective manual determinations of the condition of the deburring media currently being used in the vibration deburring machine when performing the analyses. This may be particularly useful in situations where turnover among users of vibration deburring machines is high, since knowledge is typically much harder to maintain in these types of situations.

Figure 1:
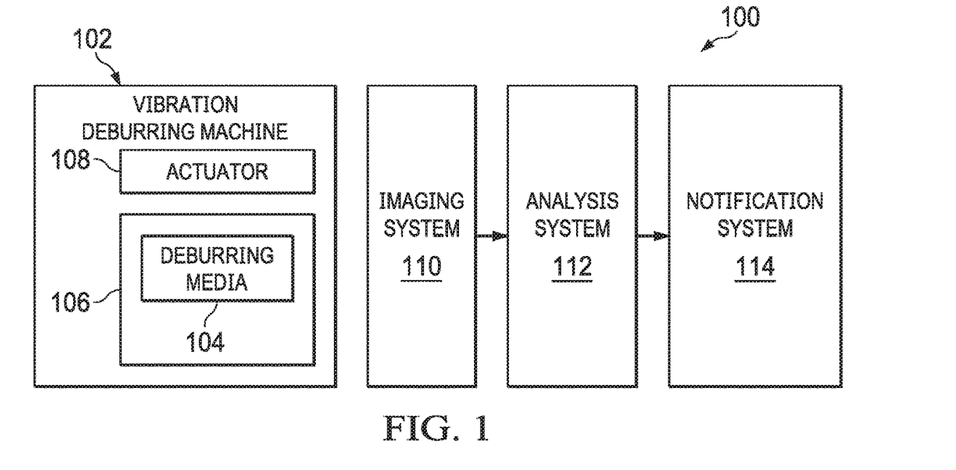
FIG. 1 illustrates an example system for monitoring the condition of deburring media in a vibration deburring machine according to this disclosure.

FIG. 1 illustrates an example system 100 for monitoring the condition of deburring media in a vibration deburring machine according to this disclosure. As shown in FIG. 1, the system 100 includes or is used in conjunction with at least one vibration deburring machine 102. As described above, the vibration deburring machine 102 uses deburring media 104 to remove burrs from metal components or other components. For example, the vibration deburring machine 102 may include a bin or other container 106 into which the deburring media 104 are placed, along with water and the metal components or other components to be deburred. The container 106 is shaken or otherwise mechanically vibrated or moved using at least one actuator 108 of the vibration deburring machine 102, which causes the deburring media 104 to remove or substantially smooth any burrs on the components being processed.

The vibration deburring machine 102 includes any suitable structure configured to use deburring media 104 to mechanically remove burrs from components being processed. The deburring media 104 includes any suitable media used to mechanically remove burrs from components being processed. Example types of deburring media 104 include deburring stones or deburring pebbles, which may be formed from abrasive materials like ceramic, aluminum oxide, or other suitable materials. The container 106 includes any suitable structure configured to hold deburring media 104 and components being processed. The container 106 can have any suitable size, shape, and dimensions, and the container 106 can be used to hold any suitable quantity of deburring media 104. The actuator 108 includes any suitable structure configured to shake, vibrate, or otherwise move the container 106 in order to cause the deburring media 104 to rub against the components being processed in order to remove or substantially smooth burrs from the components.

The system 100 includes at least one imaging system 110, at least one analysis system 112, and at least one notification system 114. The imaging system 110 captures images of the deburring media 104 being used in the vibration deburring machine 102. For example, the imaging system 110 can capture color or black-and-white images of a sample of the deburring stones, deburring pebbles, or other deburring media 104 currently being used in the vibration deburring machine 102. The sample may represent a handful or other sampling taken by a user of the deburring media 104 currently being used in the vibration deburring machine 102. Each image may capture one or multiple pieces of deburring media 104, and multiple pieces of deburring media 104 are imaged in the collection of one or more images being analyzed.

The imaging system 110 includes any suitable structure configured to capture images of deburring media 104. The imaging system 110 may, for example, represent a camera and an associated illumination system, which may have a fixed or mobile position within a facility that includes one or more instances of the vibration deburring machine 102. The imaging system 110 may also represent a mobile smartphone, tablet computer, laptop computer, digital camera, smart glasses, or other portable device carried by a user, such as within a facility that includes one or more instances of the vibration deburring machine 102. Note that these are examples only and that this disclosure is not limited to use with any particular type or types of imaging systems. Also note that there may be any number of imaging systems 110 used within a given system 100 and that an imaging system 110 may be used with a single vibration deburring machine 102 or with multiple vibration deburring machines 102.

The analysis system 112 receives and processes the images captured by the imaging system 110 in order to estimate the condition of the deburring media 104 currently used in at least one vibration deburring machine 102. For example, the analysis system 112 may receive and pre-process the images captured by the imaging system 110, such as to remove noise, correct for camera distortion, obtain a desired exposure level in the images, or perform other image pre-processing operations. Note that the types of image processing here can vary as needed or desired, or no pre-processing of the images may be needed.

The analysis system 112 analyzes the pre-processed images (or the original images) to estimate the current condition of the deburring media 104 used in at least one vibration deburring machine 102. The analysis system 112 may estimate the current condition of the deburring media 104 in any suitable manner, such as by using a pattern recognition algorithm or a machine learning algorithm. For example, a pattern recognition algorithm may be used to compare the sizes and shapes of current deburring media 104 in the captured images to shapes of known good or known bad deburring media. As another example, a machine learning algorithm may be used to process the sizes and shapes of current deburring media 104 in the captured images based on a machine learning model, such as a neural network model, that has been trained to distinguish between good and bad deburring media. As a particular example, the analysis system 112 can obtain information identifying parameters of good deburring media, apply some tolerance(s) to the parameters of the good deburring media in order to generate one or more thresholds, and apply the one or more thresholds to images of the deburring media 104 in order to differentiate between good and bad deburring media. The one or more thresholds used here can be used to distinguish deburring media 104 that have experienced some threshold amount of wear from deburring media 104 that have not experienced some threshold amount of wear.

The analysis system 112 can use the results of the pattern recognition, machine learning, or other analysis operations to estimate the overall condition of the deburring media 104 currently being used in the vibration deburring machine 102. For example, the analysis system 112 may estimate the percentage of deburring media 104 in one or more captured images that are classified as good or bad deburring media and determine the overall condition of the deburring media 104 based on that percentage. In some embodiments, the overall condition may be expressed in various ways, such as good, bad, and intermediate. For instance, a good overall condition may indicate that 85% or more of the deburring media 104 being used in the vibration deburring machine 102 have not experienced some threshold amount of wear. A bad overall condition may indicate that 75% or less of the deburring media 104 being used in the vibration deburring machine 102 have not experienced some threshold amount of wear. An intermediate overall condition may indicate that 75% to 85% of the deburring media 104 being used in the vibration deburring machine 102 have not experienced some threshold amount of wear. Of course, these percentages are for illustration only and can vary as needed or desired. In some instances, these percentages or other thresholding values may be established based on user preferences.

The analysis system 112 may optionally be further used to predict, at some point in the future, what the condition of the deburring media 104 used in at least one vibration deburring machine 102 is likely to be. The analysis system 112 may predict the future condition of the deburring media 104 in any suitable manner, such as by tracking the progression of the condition of the deburring media 104 over time and applying a prediction model to the tracked condition of the deburring media 104. Thus, in some approaches, both pattern matching and machine learning may be used, such as when pattern matching is applied to identify the current condition of the deburring media 104 and machine learning is used to predict (based on the pattern matching results) the future condition of the deburring media 104. Of course, other approaches can also be used, such as when machine learning is used to estimate both the current and future conditions of the deburring media 104.

The analysis system 112 includes any suitable structure configured to analyze images of deburring media 104, identify a condition of the deburring media 104, and optionally predict the future condition of the deburring media 104. For example, the analysis system 112 may represent a computing device, such as a desktop computer, laptop computer, server computer, tablet computer, or other computing device that is configured to execute software instructions implementing the image processing and analysis functionality of the analysis system 112. It should be noted here that while shown as forming part of the system 100, the analysis system 112 may actually be located remote from the vibration deburring machine 102 and the imaging system 110. For instance, the analysis system 112 may be implemented in a remote computing device or as part of a cloud computing environment, either of which may receive images from the imaging system 110 and provide notifications or other outputs to the notification system 114.

The notification system 114 provides notifications or other outputs generated by the analysis system 112 to one or more users. For example, the notification system 114 may represent a device that displays a graphical user interface generated by the analysis system 112 to one or more users, where the graphical user interface identifies results of an analysis performed by the analysis system 112. As a particular example, the graphical user interface may present an image of the deburring media 104 as captured by the imaging system 110 or as pre-processed by the analysis system 112, identify the number of good and bad deburring media 104 identified in the image, and optionally identify an estimated time remaining until the addition of additional deburring media 104 into the container 106 of the vibration deburring machine 102 may be needed (or an indication that additional deburring media 104 should be added into the container 106 of the vibration deburring machine 102 now). Of course, a graphical user interface may present any other or additional information associated with the analysis of deburring media 104 used, generated, or collected by the analysis system 112.

Other notifications or outputs may also be provided to one or more users or to one or more devices or systems by the analysis system 112. For example, the analysis system 112 may generate an email or text message identifying the results of an analysis, in which case the notification system 114 may include or represent an email or text messaging application. As another example, the analysis system 112 may make a prediction that additional deburring media 104 should be added to the container 106 of the vibration deburring machine 102 now or at some point in the future, and the notification system 114 may include status lights positioned on or near the vibration deburring machine 102 indicating whether additional deburring media 104 should be added to the container 106 now, soon, or at some further point in time.

The notification system 114 includes any suitable structure configured to provide deburring media analysis results or information based on the deburring media analysis results to one or more users. As noted above, various types notifications may be provided to one or more users. Thus, the actual implementation of the notification system 114 can vary as needed or desired.

Note that while the analysis system 112 and the notification system 114 are described above as being used to generate notifications for users based on analysis results, other or additional corrective actions can occur based on the analysis results. For example, the analysis system 112 or the notification system 114 may generate a maintenance ticket or otherwise initiate a maintenance task identifying when additional deburring media 104 should be added to the container 106 of the vibration deburring machine 102, such as now or at some specified point in the future. As another example, the analysis system 112 or the notification system 114 may control an automated system that can automatically add additional deburring media 104 to the container 106. In general, the analysis results generated by the analysis system 112 based on one or more images of deburring media 104 may be used in any suitable manner.

Although FIG. 1 illustrates one example of a system 100 for monitoring the condition of deburring media 104 in a vibration deburring machine 102, various changes may be made to FIG. 1. For example, various components shown in FIG. 1 may be combined, further subdivided, replicated, omitted, or placed in any other suitable arrangement and additional components may be added according to particular needs. As a particular example, the notification system 114 may be integrated into or with the analysis system 112, such as when the notification system 114 is a display device used to present graphical user interfaces generated by the analysis system 112. Also, the system 100 may include any suitable number of vibration deburring machines 102, imaging systems 110, analysis systems 112, and notification systems 114.

Figure 2:
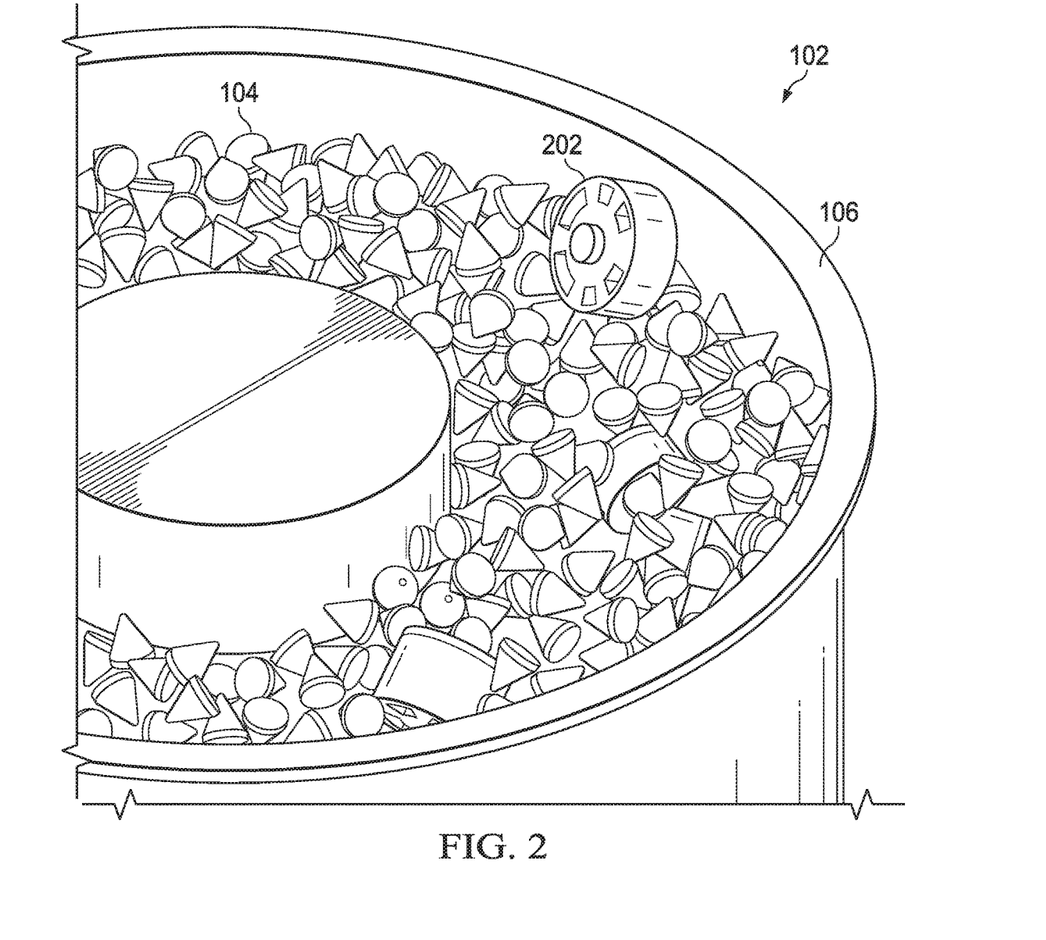
FIG. 2 illustrates an example vibration deburring machine according to this disclosure.

FIG. 2 illustrates an example vibration deburring machine 102 according to this disclosure. For ease of explanation, the vibration deburring machine 102 shown in FIG. 2 is described as being used in the system 100 of FIG. 1. However, the vibration deburring machine 102 may be used in any other suitable system that is configured to monitor the condition of deburring media 104, and the system 100 of FIG. 1 may use any other suitable vibration deburring machine.

As shown in FIG. 2, the vibration deburring machine 102 includes the container 106, which in this example is implemented as an annular container. In other words, the container 106 forms an annulus or donut shape around a central portion of the vibration deburring machine 102. The container 106 holds the deburring media 104 and one or more components 202 being processed. Water is typically added to the container 106 in order to facilitate smoother rubbing of the deburring media 104 against the one or more components 202 being processed and to help remove material that has been rubbed off the one or more components 202. Note that while a specific type of component 202 is shown in FIG. 2, this is for illustration only. Any suitable components to be subjected to a deburring process may be placed in the vibration deburring machine 102 of FIG. 2. As a particular example, the components 202 may represent metal components that undergo computer numerical controlled (CNC) milling operations.

The actuator 108 of the vibration deburring machine 102 can shake, vibrate, or otherwise move the container 106 here in order to cause the deburring media 104 to rub against the one or more components 202. This helps to substantially or completely remove burrs from the one or more components 202 and smooth surfaces of the one or more components 202. However, this also causes the deburring media 104 to dull or wear down over time, such as due to contact with each other, with the components 202, and with the container 106. As a result, the length of time needed to perform a deburring process can increase, or the deburring process may not be completed successfully. Thus, the system 100 can be used here to estimate the condition of the deburring media 104 in the vibration deburring machine 102 and possibly to predict the future condition of the deburring media 104. The system 100 can output a graphical user interface or other notification(s) identifying the condition or predicted condition or take other suitable action based on the analysis of the deburring media 104.

This type of functionality may be useful in a number of applications or industries. For example, various parties in the automotive and aerospace industries are routinely involved with the fabrication of metal components or other components that can be subjected to deburring processes. As another example, various parties in the defense industry are often involved with in-house fabrication of metal components or other components for use in defense-related products, and these components can be subjected to deburring processes. Note, however, that the functionality described in this patent document may be used by any suitable party or parties in any suitable industry or industries in order to monitor and optionally predict the condition of deburring media 104 used in deburring operations.

The ability to monitor the condition of deburring media 104 used in vibration deburring machines 102 based on captured images may provide a cheaper alternative compared to retrofitting the vibration deburring machines 102 with some type of "smart" sensing functionality. This can be particularly useful in facilities that include a large number of legacy vibration deburring machines 102 that lack "smart" features or other built-in sensing functionality. Moreover, the approaches described in this patent document can support the ability to incorporate the condition of deburring media 104 into "smart factory" or other digital automation control processes, which can provide various benefits such as reduced hardware costs.

Although FIG. 2 illustrates one example of a vibration deburring machine 102, various changes may be made to FIG. 2. For example, the container 106 of the vibration deburring machine 102 may have any other suitable size, shape, and dimensions. Also, the vibration deburring machine 102 may be used to process any other suitable components 202, and those components 202 may undergo any type of machining or other processing operations that lead to the creation of burrs.

Figure 3:
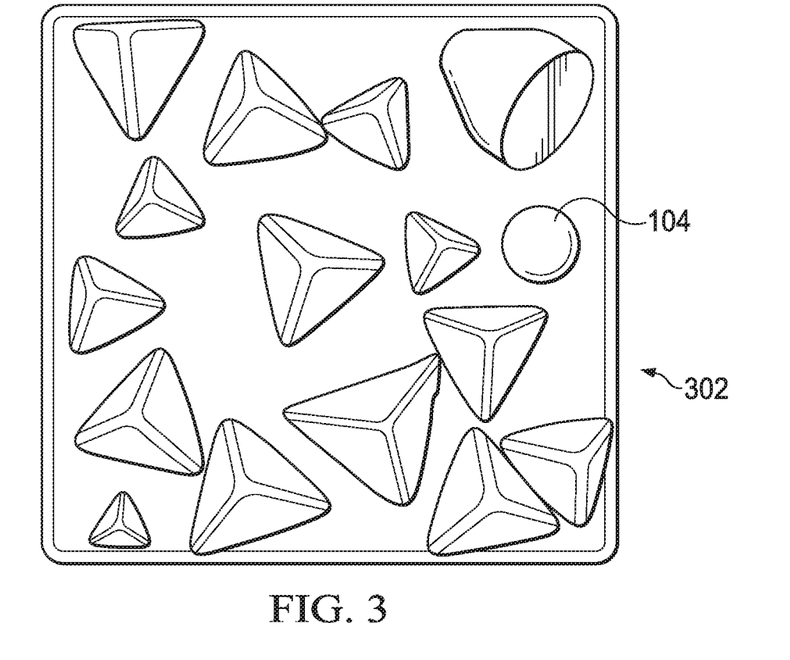
FIG. 3 illustrates example deburring media used in a vibration deburring machine according to this disclosure.

FIG. 3 illustrates example deburring media 104 used in a vibration deburring machine 102 according to this disclosure. For ease of explanation, the deburring media 104 shown in FIG. 3 is described as being used in the vibration deburring machine 102 of FIG. 2 within the system 100 of FIG. 1. However, the deburring media 104 may be used in any other suitable vibration deburring machine and in any other suitable system, and the system 100 of FIG. 1 or the vibration deburring machine 102 of FIG. 2 may use any other suitable deburring media.

As shown in FIG. 3, a sample of deburring media 104 used in a vibration deburring machine 102 has been placed on a tray 302. In some embodiments, each piece of deburring media 104 may be shaped as a tetrahedron (triangular pyramid) or a cylinder prior to use. After being placed into use, the deburring media 104 wears down and becomes more rounded or smooth in shape. As can be seen in the example shown in FIG. 3, for instance, some of the deburring media 104 still have sharper corners and edges of their original tetrahedron shapes. Others of the deburring media 104 have rounded corners and edges of their original tetrahedron shapes, indicating some wear to that deburring media 104. Still others of the deburring media 104 have been worn down even more into shapes like blunted nosecones or rounded cones.

Based on knowledge of the original shape or shapes of the deburring media 104 used in a vibration deburring machine 102, one or more images of the deburring media 104 can be captured and analyzed to estimate the current and/or future condition of the deburring media 104. For example, pattern recognition or machine learning can be used to estimate how much of each piece of deburring media 104 has been worn down due to use, and a determination can be made whether additional deburring media 104 should be added to the vibration deburring machine 102 based on that determination. This may be based on, for instance, a measure of the edge roundness and sharpness of the deburring media 104 in the image(s) and a comparison of the measured edge roundness and sharpness to the edge roundness and sharpness of unused deburring media. Note that one or more images of a single sample of deburring media 104 may be used during an analysis, or multiple images of multiple samples of deburring media 104 may be used during an analysis. Also, note again that adding additional deburring media 104 to a vibration deburring machine 102 may involve mixing the additional deburring media 104 with the current deburring media 104 in the vibration deburring machine 102 or replacing the current deburring media 104 in the vibration deburring machine 102 with the additional deburring media 104.

The sample of the deburring media 104 shown on the tray 302 in FIG. 3 may be obtained in any suitable manner. For example, an operator may use his or her hands or a tool to randomly extract the sample of deburring media 104 from a container 106 of a vibration deburring machine 102, place the sample of deburring media 104 on the tray 302, and position the deburring media 104 on the tray for imaging. As a particular example, the operator may ensure that each piece of deburring media 104 on the tray 302 is separated from neighboring pieces so that an image can clearly capture the shape of each piece of deburring media 104. Note, however, that other approaches may be used for capturing images of deburring media 104, which may or may not involve placing pieces of the deburring media 104 on a tray 302.

Although FIG. 3 illustrates one example of deburring media 104 used in a vibration deburring machine 102, various changes may be made to FIG. 3. For example, while FIG. 3 illustrates examples of the shapes and sizes of various pieces of deburring media 104, deburring media 104 can come in a wide variety of shapes and sizes. As a result, the deburring media 104 that are captured in any given image may have various shapes and sizes and can vary widely.

Figure 4:
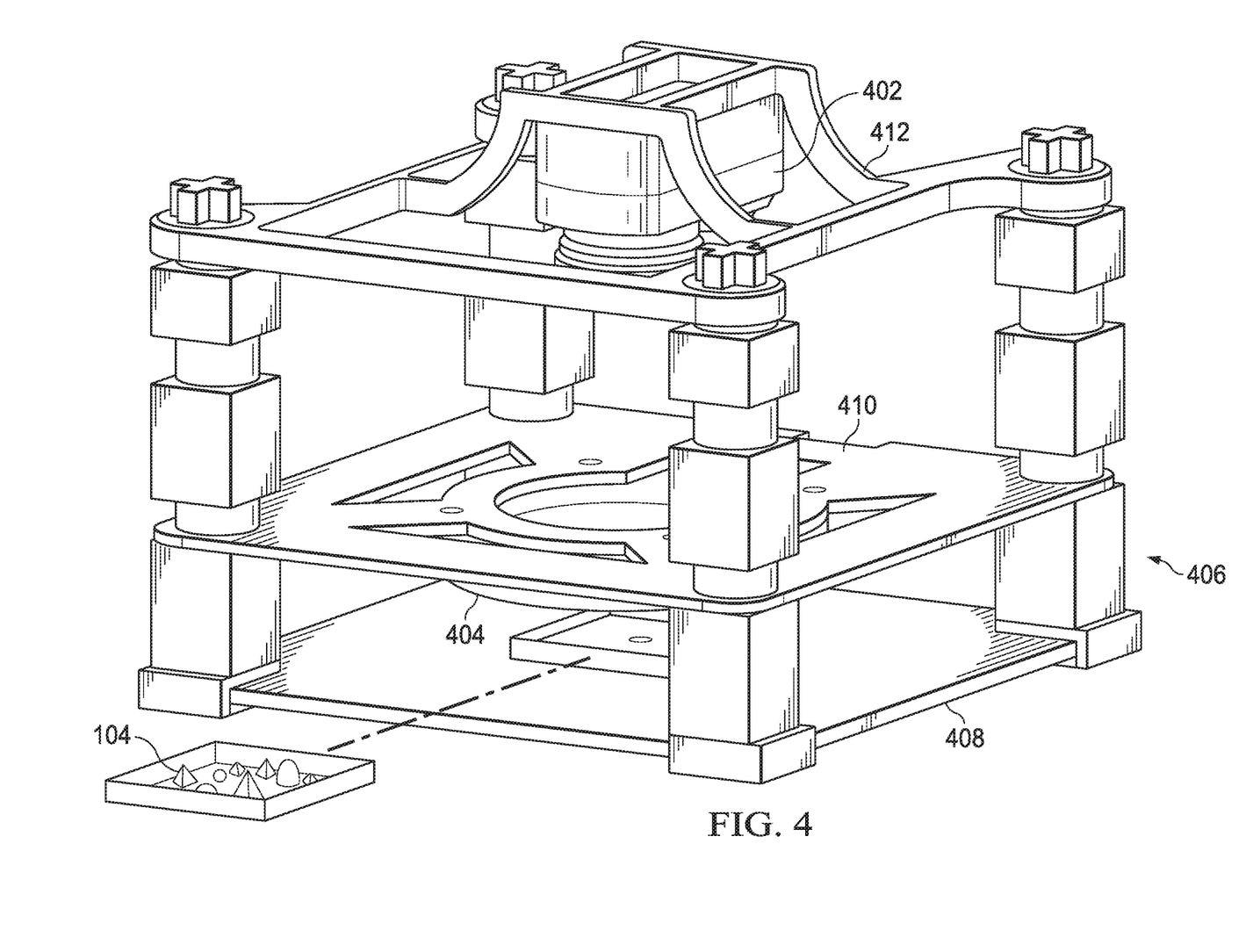
FIGS. 4 and 5 illustrate example imaging systems for use in monitoring the condition of deburring media in a vibration deburring machine according to this disclosure.
Figure 5:
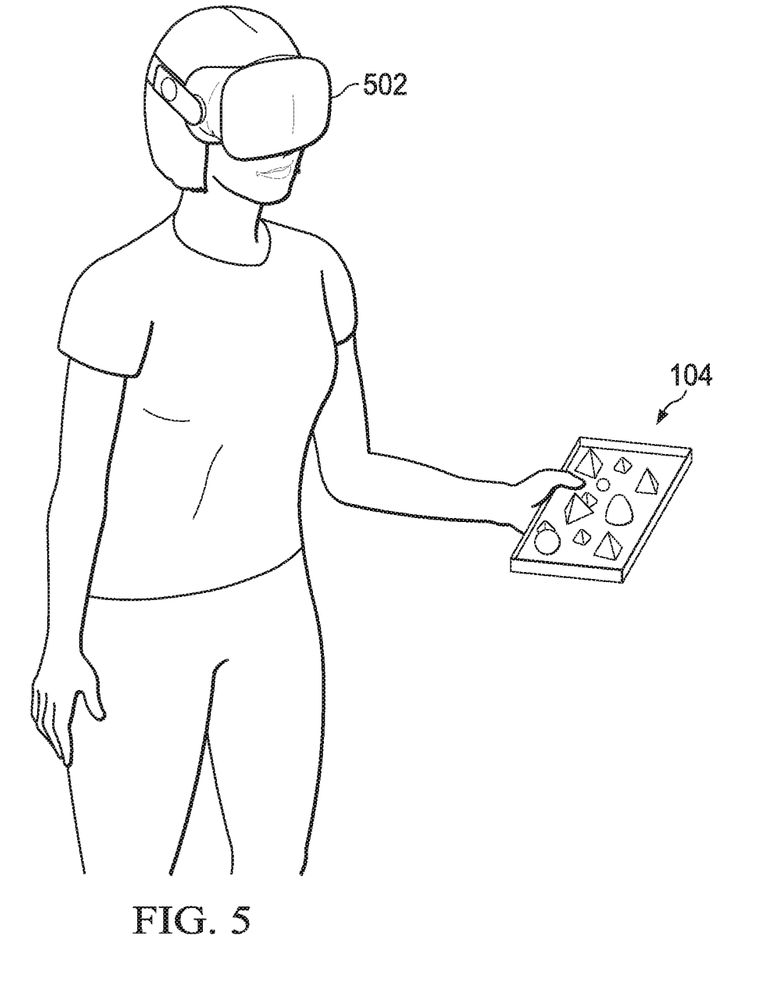

FIGS. 4 and 5 illustrate example imaging systems 110 for use in monitoring the condition of deburring media 104 in a vibration deburring machine 102 according to this disclosure. For ease of explanation, the imaging systems 110 shown in FIGS. 4 and 5 are described as being used in the system 100 of FIG. 1. However, the imaging systems 110 may be used in any other suitable system configured to monitor the condition of deburring media 104, and the system 100 of FIG. 1 may use any other suitable imaging system.

As shown in FIG. 4, the imaging system 110 in this example includes a camera 402 and an illumination source 404, which are mounted on or otherwise connected to a frame 406. The camera 402 is configured to capture images of samples of deburring media 104 that are placed at a specified location on a base 408 of the frame 406. For example, the camera 402 may capture color or black-and-white images of the deburring media 104 placed on the base 408. The camera 402 includes any suitable imaging sensor configured to capture images of deburring media 104, such as a charge-coupled device (CCD), a complementary metal oxide semiconductor (CMOS) device, a charge injection device (CID), or other digital camera. Note that in this example, the deburring media 104 may be carried by a tray or other structure onto the base 408 of the frame 406, although this need not be the case.

The illumination source 404 is configured to generate light that illuminates the deburring media 104 being imaged. Among other things, this may allow images having higher contrast or improved image quality to be captured by the camera 402, such as when the deburring media 104 are lighter in color and are placed against a darker tray 302 or other darker background (or vice versa). The illumination source 404 includes any suitable structure configured to generate illumination, such as one or more light emitting diodes (LEDs).

In this example, the illumination source 404 is coupled to an intermediate support 410 of the frame 406, which is located between a top support 412 of the frame 406 and the base 408 of the frame 406. This allows the illumination source 404 to be positioned closer to the deburring media 104 and away from the camera 402 while still providing illumination to the deburring media 104. However, the illumination source 404 may be positioned in any other suitable locations, such as around the camera 402 on the top support 412 of the frame 406 or around the deburring media 104 being imaged on the base 408 of the frame 406.

The frame 406 is used here to hold the camera 402 and illumination source 404 in suitable positions for use in imaging the deburring media 104 placed on the base 408 of the frame 406. The frame 406 can have any suitable size, shape, and dimensions, at least some of which can depend (at least in part) of the desired spacing between the camera 402 and the deburring media 104 being imaged. In some embodiments, for example, the frame 406 may maintain the camera 402 at a distance of 30, 100, or 150 millimeters from the deburring media 104 being imaged, although other distances may be used. Also, the frame 406 may be adjustable so that the camera 402 can be placed at different distances from the deburring media 104 being imaged.

The frame 406 may be formed from any suitable material(s) and in any suitable manner. In some embodiments, different portions of the frame 406 may be fabricated separately, such as by using additive manufacturing. The different portions of the frame 406 may then be connected to one another, such as by snapping different portions of the frame 406 together (similar to children's blocks). Of course, the frame 406 may be integrally formed or manufactured in any other suitable manner, and the form of the frame 406 may vary based on the implementation. The camera 402 and the illumination source 404 may each be coupled to the frame 406 in any suitable manner, such as by using bolts, screws, or other connectors.

Images captured by the camera 402 may be provided to the analysis system 112 in any suitable manner. For example, in some cases, the camera 402 may be configured to communicate with the analysis system 112 over a wired or wireless communication channel. In other cases, the camera 402 may be configured to store captured images on a portable storage device (such as a portable Flash drive or Secure Digital card), and the portable storage device can be coupled to the analysis system 112 so that the captured images can be retrieved. In general, any suitable technique may be used to transport captured images from the camera 402 to the analysis system 112.

As shown in FIG. 5, the imaging system 110 in this example includes a headset 502 worn by a user. For example, the headset 502 may represent smart glasses, an augmented reality headset, or other device worn on the head of a user. The headset 502 includes a camera that can be used to capture images of samples of deburring media 104 used in at least one vibration deburring machine 102. In some embodiments, the headset 502 may represent an augmented reality headset worn by a user in a smart factory, where the augmented reality headset is used to obtain various data (including images of the deburring media 104) from a factory or other manufacturing environment.

Images captured by the headset 502 may be provided to the analysis system 112. For example, the headset 502 may be configured to communicate with the analysis system 112 over a wireless communication channel. Again, any suitable technique may be used to transport captured images from the headset 502 to the analysis system 112. The headset 502 may also be configured to transmit or receive other information over the wireless communication channel, such as additional information captured by the headset 502 related to a manufacturing environment or information to be displayed by the headset 502 to a user.

Although FIGS. 4 and 5 illustrate examples of imaging systems 110 for use in monitoring the condition of deburring media 104 in a vibration deburring machine 102, various changes may be made to FIGS. 4 and 5. For example, any other suitable imaging device or system may be used to capture images of deburring media 104. Other example types of devices that may be used include mobile smartphones, tablet computers, or laptop computers. This disclosure is not limited to use with any particular type of imaging device or system.

Figure 6:
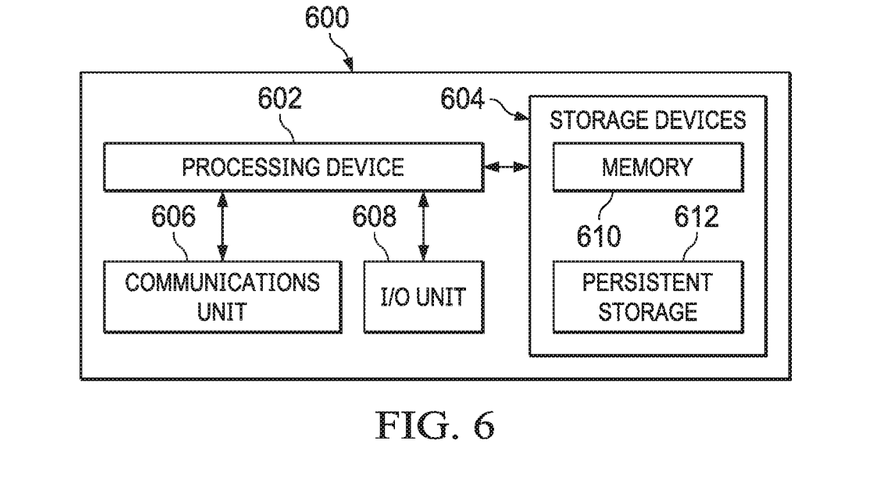
FIG. 6 illustrates an example analysis system for use in monitoring the condition of deburring media in a vibration deburring machine according to this disclosure.

FIG. 6 illustrates an example analysis system 112 for use in monitoring the condition of deburring media 104 in a vibration deburring machine 102 according to this disclosure. For ease of explanation, the analysis system 112 shown in FIG. 6 is described as being used in the system 100 of FIG. 1. However, the analysis system 112 may be used in any other suitable system configured to monitor the condition of deburring media 104, and the system 100 of FIG. 1 may use any other suitable analysis system.

As shown in FIG. 6, the analysis system 112 denotes a computing device or system that includes at least one processing device 602, at least one storage device 604, at least one communications unit 606, and at least one input/output (I/O) unit 608. The processing device 602 may execute instructions that can be loaded into a memory 610. The processing device 602 includes any suitable number(s) and type(s) of processors or other processing devices in any suitable arrangement. Example types of processing devices 602 include one or more microprocessors, microcontrollers, digital signal processors (DSPs), application specific integrated circuits (ASICs), field programmable gate arrays (FPGAs), or discrete circuitry.

The memory 610 and a persistent storage 612 are examples of storage devices 604, which represent any structure(s) capable of storing and facilitating retrieval of information (such as data, program code, and/or other suitable information on a temporary or permanent basis). The memory 610 may represent a random access memory or any other suitable volatile or non-volatile storage device(s). The persistent storage 612 may contain one or more components or devices supporting longer-term storage of data, such as a read only memory, hard drive, Flash memory, or optical disc.

The communications unit 606 supports communications with other systems or devices. For example, the communications unit 606 can include a network interface card or a wireless transceiver facilitating communications over a wired or wireless network. As a particular example, the communications unit 606 may include at least one communication interface used to receive images of deburring media 104 to be processed by the analysis system 112, such as images from the camera 402 or the headset 502. The communications unit 606 may support communications through any suitable physical or wireless communication link(s).

The I/O unit 608 allows for input and output of data. For example, the I/O unit 608 may provide a connection for user input through a keyboard, mouse, keypad, touchscreen, or other suitable input device. The I/O unit 608 may also send output to a display or other suitable output device. Note, however, that the I/O unit 608 may be omitted if the analysis system 112 does not require local I/O, such as when the analysis system 112 represents a server or other device that can be accessed remotely.

In some embodiments, instructions may be executed by the processing device 602 to analyze captured images of deburring media 104. For example, the instructions may be executed by the processing device 602 to pre-process images of deburring media 104, perform pattern recognition or machine learning using the images of the deburring media 104, and generate graphical user interfaces or other outputs related to the deburring media 104.

Although FIG. 6 illustrates one example of an analysis system 112 for use in monitoring the condition of deburring media 104 in a vibration deburring machine 102, various changes may be made to FIG. 6. For example, computing devices and systems come in a wide variety of configurations, and FIG. 6 does not limit this disclosure to any particular computing device or system.

Figure 7:
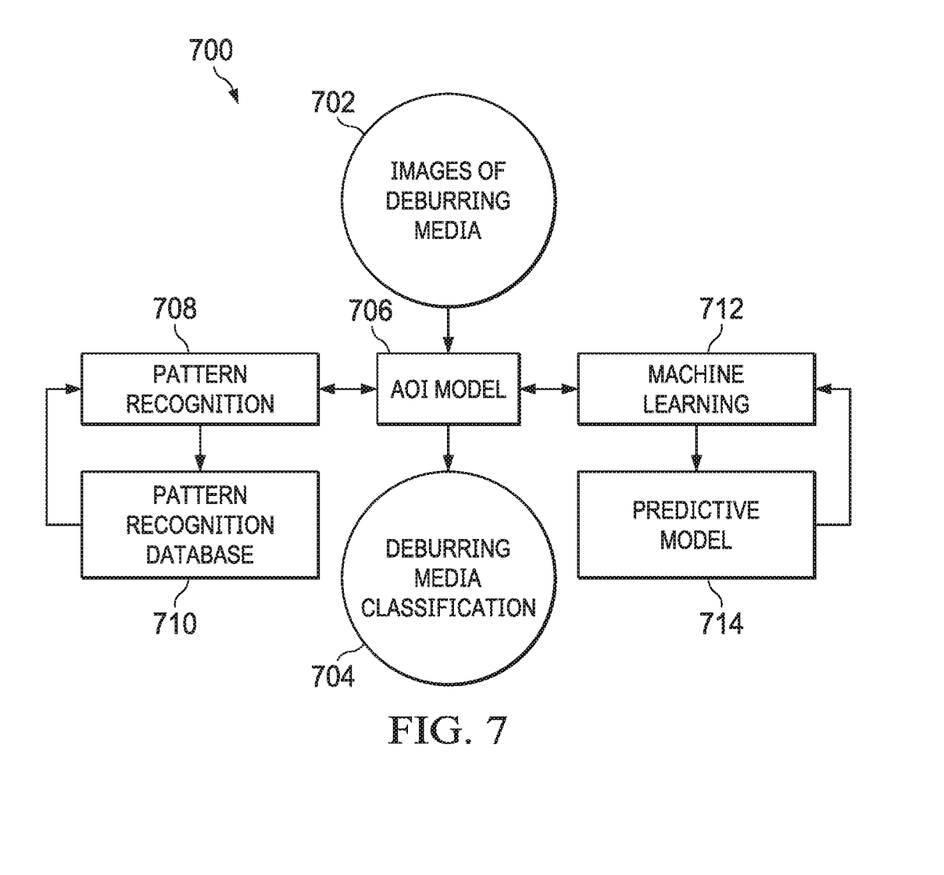
FIG. 7 illustrates an example functional architecture for monitoring the condition of deburring media in a vibration deburring machine according to this disclosure.

FIG. 7 illustrates an example functional architecture 700 for monitoring the condition of deburring media 104 in a vibration deburring machine 102 according to this disclosure. For ease of explanation, the functional architecture 700 shown in FIG. 7 may be described as being implemented or supported using one or more components in the system 100 of FIG. 1, at least one of which may be implemented as shown in FIG. 6. However, the functional architecture 700 shown in FIG. 7 may be implemented or supported by any suitable device(s) and in any suitable system(s).

As shown in FIG. 7, one or more images 702 of deburring media 104 are received, and the functional architecture 700 operates to produce one or more deburring media classifications 704. The deburring media classifications 704 generally include an identification of the condition of each piece of deburring media 104 contained in the one or more images 702. For example, in some embodiments, the deburring media classifications 704 may represent indicators of whether the pieces of deburring media 104 in the image(s) 702 are considered "good" or "bad," such as when the good deburring media 104 have wear less than a threshold amount and the bad deburring media 104 have wear more than the threshold amount. The deburring media classifications 704 can be used by the analysis system 112 or other device or system to support other functions. Examples of other functions can include estimating the percentage of good and bad deburring media 104 currently used in a vibration deburring machine 102 or identifying if and when additional deburring media 104 should be added to the vibration deburring machine 102. Another example of the functions can include predicting when preventative maintenance or other maintenance should be scheduled for the vibration deburring machine 102.

The images 702 here are processed using an automated optical inspection (AOI) model 706, which generally represents the overall image processing and analysis functionality of the analysis system 112. For example, the AOI model 706 can subject the images 702 to any desired pre-processing operations, such as to improve image quality or other characteristics of the images 702. The AOI model 706 may also divide the images 702 into smaller sub-images, where each sub-image contains pixels that capture a single piece of deburring media 104. The AOI model 706 can further interact with various other processes within the functional architecture 700 in order to identify the classifications 704 for the individual pieces of deburring media 104 and/or to obtain information that can be used to identify the classifications 704 for the individual pieces of deburring media 104.

In this example, the AOI model 706 can interact with a pattern recognition process 708, which can analyze the images or sub-images of the deburring media 104 (or information associated with the images or sub-images of the deburring media 104) in order to compare the shapes and sizes of the deburring media 104 to shapes and sizes in a pattern recognition database 710. The shapes and sizes in the pattern recognition database 710 can correspond to different deburring media, such as deburring media in known good or known bad conditions (and possibly deburring media of different initial shapes and sizes in known good or known bad conditions). The pattern recognition process 708 can compare the shapes and sizes of the deburring media 104 currently being used in a vibration deburring machine 102 against the shapes and sizes of known good or known bad deburring media in the pattern recognition database 710. The pattern recognition process 708 can thereby determine whether each piece of deburring media 104 contained in the images 702 is most similar to a known good piece or a known bad piece of deburring media 104, which allows the pattern recognition process 708 to estimate the condition of each piece of deburring media 104 captured in the images 702.

Note that while "good" and "bad" are used here and elsewhere to distinguish between deburring media 104 that have not experienced excessive wear and deburring media 104 that have experienced excessive wear, this sort of binary classification is for illustration only, and other embodiments of the pattern recognition process 708 may be used. For instance, the pattern recognition process 708 may classify each piece of deburring media 104 as good, intermediate, or bad, such as when the intermediate classification indicates that wear on the piece of deburring media 104 exceeds a first threshold but not a second threshold. In general, any number of categories may be used in the classification of the deburring media 104. Also note that the use of hard threshold values may not be needed since pattern recognition can be used, meaning the pattern recognition process 708 may operate by comparing images of current deburring media 104 to deburring media with known classifications in order to classify the current deburring media 104 (without making any actual calculations of wear). Of course, the analysis system 112 may make actual calculations of estimated wear and compare the resulting values to one or more hard threshold values when analyzing the deburring media 104 in the images 702.

In this example, the AOI model 706 can also or alternatively interact with a machine learning process 712, which can analyze the images or sub-images of the deburring media 104 (or information associated with the images or sub-images of the deburring media 104) based on a predictive model 714. The predictive model 714 is generally trained to distinguish between different types of deburring media 104, such as good and bad deburring media (or some non-binary classification of deburring media). For example, the predictive model 714 can be trained by providing images of known good and known bad deburring media and adjusting parameters of the predictive model 714 until the images of the known good and known bad deburring media are classified correctly by the predictive model 714. Once properly trained, the machine learning process 712 uses the predictive model 714 to classify the deburring media 104 contained in the images 702 (or the sub-images) in order to estimate the conditions of the different pieces of deburring media 104 in the images 702.

In some embodiments, the machine learning process 712 and the predictive model 714 may also or alternatively be used to estimate the future condition of the deburring media 104 used in a vibration deburring machine 102. For example, the machine learning process 712 and the predictive model 714 may identify timestamps when different images 702 of deburring media 104 from a vibration deburring machine 102 are analyzed over time in order to identify a trend of the overall condition of the deburring media 104. The machine learning process 712 and the predictive model 714 may also identify how long the vibration deburring machine 102 has actually been operating since the deburring media 104 was placed into the vibration deburring machine 102. The machine learning process 712 and the predictive model 714 may further identify various characteristics of components 202 that have been processed by the deburring media 104 currently in the vibration deburring machine 102, such as the components' sizes, weights, dimensions, materials, and numbers of edges. This or other information may be used by the predictive model 714 to identify when additional deburring media 104 may be needed in the vibration deburring machine 102, to estimate when preventative maintenance should be scheduled for the vibration deburring machine 102, or to identify other predictions related to the vibration deburring machine 102 or the deburring media 104.

The machine learning process 712 and the predictive model 714 may support any suitable machine learning algorithm in the functional architecture 700. Example types of machine learning algorithms that may be used here include neural networks, convolutional neural networks, decision trees, and rules-based learning. In general, various machine learning algorithms are known in the art and more are sure to be developed in the future, and this disclosure is not limited to any particular type of machine learning algorithm. In fact, machine learning is not necessarily required in the functional architecture 700.

Note that while both the pattern recognition process 708/pattern recognition database 710 and the machine learning process 712/predictive model 714 are shown in FIG. 7, the functional architecture 700 may operate using only pattern recognition without machine learning or only machine learning without pattern recognition. There is no requirement here that both types of analyses be performed in the functional architecture 700. If both types of analyses are performed in the functional architecture 700, the results of the analyses may be used in any suitable manner. For example, initial classifications based on pattern recognition and machine learning may be determined for each piece of deburring media 104, and the initial classifications may be averaged or otherwise combined to produce the classification 704 for each piece of deburring media 104. As another example, the pattern recognition functionality may be used to estimate the current classifications 704 of the deburring media 104, and the machine learning functionality may be used to estimate the future condition of the deburring media 104 based on current and prior classifications 704 of the deburring media 104.

Although FIG. 7 illustrates one example of a functional architecture 700 for monitoring the condition of deburring media 104 in a vibration deburring machine 102, various changes may be made to FIG. 7. For example, components can be added, omitted, combined, further subdivided, replicated, or placed in any other suitable configuration in the functional architecture 700 according to particular needs. Also, the functionality for monitoring the condition of deburring media 104 in a vibration deburring machine 102 may be used in any other suitable functional architecture.

Figure 8:
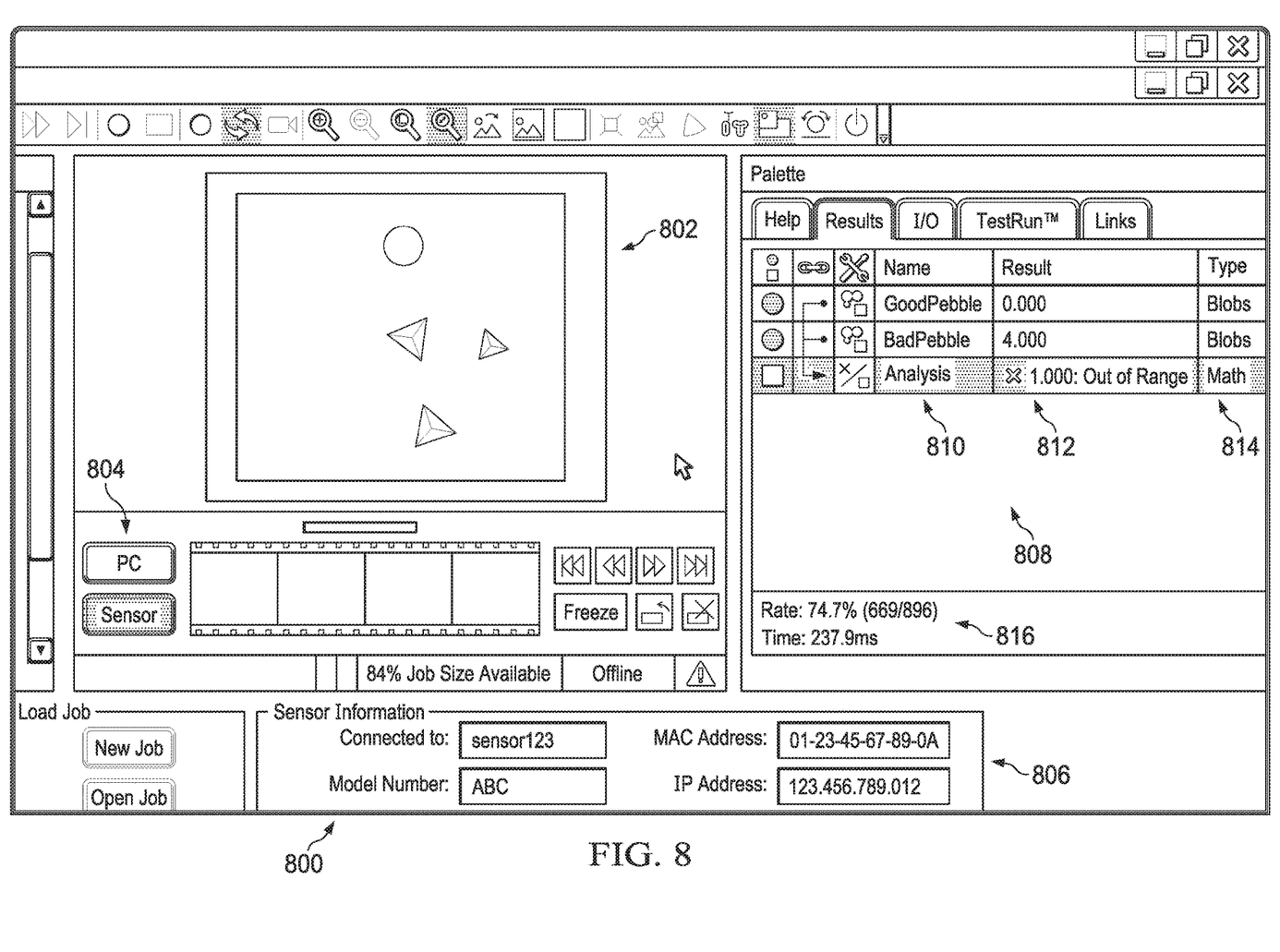
FIG. 8 illustrates an example graphical user interface for outputting information associated with monitoring the condition of deburring media in a vibration deburring machine according to this disclosure.

FIG. 8 illustrates an example graphical user interface 800 for outputting information associated with monitoring the condition of deburring media 104 in a vibration deburring machine 102 according to this disclosure. For ease of explanation, the graphical user interface 800 shown in FIG. 8 may be described as being generated by the analysis system 112 and presented via the notification system 114 in the system 100 of FIG. 1. However, the graphical user interface 800 shown in FIG. 8 may be implemented or supported by any suitable device(s) and in any suitable system(s).

As shown in FIG. 8, the graphical user interface 800 is used to interact with a user in order to obtain and provide information related to deburring media 104 used in at least one vibration deburring machine 102. In this example, the graphical user interface 800 includes an image area 802, which can be used to display an image of deburring media 104 as captured by an imaging system 110. The image area 802 may initially be blank and may later be populated by an image after the image has been captured by the imaging system 110 and selected by the user.

The graphical user interface 800 also includes various controls 804, which may be used by a user to control the image in the image area 802 that is selected for further processing. For example, some controls 804 may allow the user to identify a specific imaging system 110 to be used to capture one or more images of deburring media 104, and other controls 804 may be used to facilitate capture of the one or more images by the specific imaging system 110. In some implementations, for example, the specific imaging system 110 may capture a stream of images, and one or more of the controls 804 may allow the user to scroll through the stream of images and select the desired image or images to be processed. This may allow, for instance, multiple (and possibly numerous) samples of the deburring media 104 to be imaged in quick succession, and a user may later view the captured images of the various samples in order to select the image or images to be further analyzed. Note that the specific controls 804 used here can vary, such as based on whether different imaging systems 110 may be selected or how image capture by the imaging system(s) 110 can be controlled.

An information area 806 of the graphical user interface 800 provides information about the specific imaging system 110 that was used to capture the image of deburring media 104 shown in the image area 802 (if any). In this example, the information area 806 identifies the name, model number, Medium Access Control (MAC) address, and Internet Protocol (IP) address of an imaging system 110. Of course, any other or additional information about an imaging system 110 may be presented here.

Further, the graphical user interface 800 includes a window 808 in which (among other things) the results of an analysis of the image in the image area 802 can be presented to a user. In this particular example, the user can actually select various tabs to view different information in the window 808, and the "results" tab is selected in FIG. 8. As shown here, the results of the image analysis are placed in a table format. More specifically, the table of results includes various rows, where each row includes a label 810 associated with a specific result, a value 812 associated with the result, and a type description 814 associated with the result. Of course, the results of an analysis can be expressed in any other suitable format, and the results of the analysis may include any other or additional information associated with the analysis.

As can be seen here, two rows in the table identify the number of good pieces of deburring media 104 identified in the captured image and the number of bad pieces of deburring media 104 identified in the captured image. In this particular example, the captured image includes four pieces of deburring media 104, and the table of results identifies all four pieces of deburring media 104 as being bad. The bad pieces of deburring media 104 may be identified, for example, based on the wear of their edges or corners and/or the overall sizes of the deburring media 104. A third row here identifies a ratio of the number of bad pieces of deburring media 104 to the total number of pieces of deburring media 104. In this type of embodiment, the overall condition of the deburring media 104 may be based at least partially on the ratio of bad to total deburring media 104. The specific type descriptions 814 used here include "blobs" (which refer to pieces of deburring media 104 identified in the captured image) and "math" (which refers to a ratio or other mathematical calculation). Of course, these contents are for illustration only and can change as needed or desired.

As can be seen in FIG. 8, the third row also includes a warning or other notification that the ratio of bad to total deburring media 104 is excessive, such as when the ratio is higher than some specified threshold. This notification can inform a user that additional testing of the deburring media 104 may be needed or that additional deburring media 104 should be added to the vibration deburring machine 102. As noted above, a number of corrective actions can occur based on the analysis results. In some embodiments, a specified number of analysis results may need to indicate that a problem exists before corrective action actually occurs, which can help to avoid corrective action from occurring in response to a single or limited number of negative analysis results.

In addition, the graphical user interface 800 provides analysis information 816, which provides general information about the particular analysis that was performed to produce the displayed results. For example, the analysis information 816 may identify a rate value, which identifies the position of the currently-displayed analysis in a stream of analyses performed for a vibration deburring machine 102. The analysis information 816 may also identify a length of time required for the currently-displayed analysis. Once again, these contents are for illustration only and can change as needed or desired.

The graphical user interface 800 here provides an effective interface for monitoring the condition of deburring media 104 in at least one vibration deburring machine 102. For example, the graphical user interface 800 allows a user to control the imaging system(s) 110 used to capture image(s) of deburring media 104, to control the capture of the image(s) of the deburring media 104, and to review the results of one or multiple analyses of the image(s) of the deburring media 104. The user is also able to view any notifications related to the results of the analysis or analyses of the deburring media 104.

Although FIG. 8 illustrates one example of a graphical user interface 800 for outputting information associated with monitoring the condition of deburring media 104 in a vibration deburring machine 102, various changes may be made to FIG. 8. For example, the contents, layout, and arrangement of the graphical user interface 800 can vary as needed or desired. In general, graphical user interfaces are highly customizable and can be used to present information to and receive inputs from one or more users in any number of ways.

Figure 9:
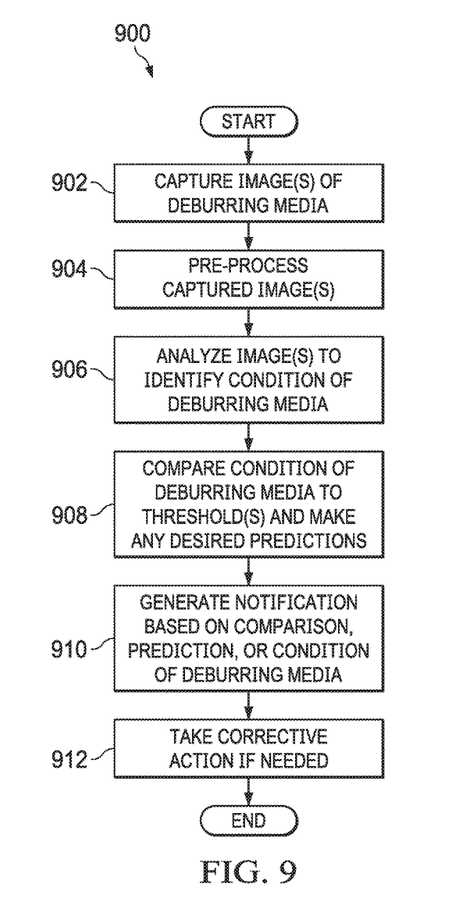
FIG. 9 illustrates an example method for monitoring the condition of deburring media in a vibration deburring machine according to this disclosure.

FIG. 9 illustrates an example method 900 for monitoring the condition of deburring media 104 in a vibration deburring machine 102 according to this disclosure. For ease of explanation, the method 900 shown in FIG. 9 may be described as being implemented or supported using various components in the system 100 of FIG. 1, at least one of which may be implemented as shown in FIG. 6 and which may support the functional architecture 700 of FIG. 7. However, the method 900 shown in FIG. 9 may be implemented or supported by any suitable device(s) and in any suitable system(s) with any suitable functional architecture.

As shown in FIG. 9, one or more images of deburring media used in a vibration deburring machine are captured at step 902. This may include, for example, the imaging system 110 capturing one or more color or black-and-white images 702 of at least one sample of deburring media 104 taken from a vibration deburring machine 102. The one or more captured images may optionally be pre-processed at step 904. This may include, for example, the imaging system 110 or analysis system 112 pre-processing the captured image(s) 702 to adjust their exposure, remove noise, or otherwise improve their image quality.

The one or more images are processed to identify the condition of the deburring media captured in the image(s) at step 906. This may include, for example, the analysis system 112 performing the pattern recognition process 708 and/or the machine learning process 712 to analyze the size and shape of each piece of deburring media 104 captured in the image(s) 702. As particular examples, this may include the analysis system 112 performing the pattern recognition process 708 to determine whether each piece of deburring media 104 captured in the image(s) 702 is more similar to known good or known bad pieces of deburring media and/or performing the machine learning process 712 to classify each piece of deburring media 104 captured in the image(s) 702 as a good or bad piece of deburring media. This may further include the analysis system 112 identifying the overall condition of the deburring media 104 or at least the deburring media 104 captured in the image(s) 702, such as by calculating one or more ratios or otherwise combining the individual conditions of the individual pieces of deburring media 104.

The condition(s) of the deburring media can be compared to at least one threshold at step 908, and at least one notification can be generated based on the comparison or the condition(s) of the deburring media at step 910. This may include, for example, the analysis system 112 generating a graphical user interface 800, which can be presented by the notification system 114. In some embodiments, the graphical user interface 800 can identify the number of good and bad pieces of deburring media 104 identified in at least one image 702, along with any relevant ratio(s) and any notification(s) based on the ratio(s). Optionally, one or more predictions related to the deburring media 104 or the vibration deburring machine 102 may also be made here, such as a prediction of the future condition of the deburring media 104 or a prediction of future maintenance for the vibration deburring machine 102. The prediction or predictions may also be presented using a graphical user interface, along with any notification(s) associated with the prediction(s).

If necessary, additional corrective action can be taken at step 912. This may include, for example, a user deciding to add additional deburring media 104 to the vibration deburring machine 102 or maintenance personnel deciding to perform or schedule maintenance for the vibration deburring machine 102. In general, the results of the analysis of the deburring media 104 can be used in any suitable manner.

Although FIG. 9 illustrates one example of a method 900 for monitoring the condition of deburring media 104 in a vibration deburring machine 102, various changes may be made to FIG. 9. For example, while shown as a series of steps, various steps in FIG. 9 may overlap, occur in parallel, occur in a different order, or occur any number of times. As a particular example, multiple analyses may occur and negative results may be obtained before any additional corrective action is taken.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed.

For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
    at least one memory configured to store at least one image of multiple pieces of deburring media used in a vibration deburring machine; and
    at least one processor configured to:
        analyze the at least one image to determine a condition of each of the multiple pieces of deburring media;
        determine an overall condition of the deburring media; and
        generate a graphical user interface containing a notification based on at least one of: the conditions of the multiple pieces of deburring media and the overall condition of the deburring media.

2. The apparatus of claim 1, wherein, to analyze the at least one image to determine the condition of each of the multiple pieces of deburring media, the at least one processor is configured to:
    perform pattern recognition to compare shapes and sizes of the multiple pieces of deburring media to shapes and sizes of deburring media having known conditions; and
    determine which of the deburring media having a specific known condition is most similar to each of the multiple pieces of deburring media.

3. The apparatus of claim 1, wherein, to analyze the at least one image to determine the condition of each of the multiple pieces of deburring media, the at least one processor is configured to use a trained machine learning model to classify each of the multiple pieces of deburring media as having a specific condition.

4. The apparatus of claim 1, wherein, to determine the overall condition of the deburring media, the at least one processor is configured to determine one or more ratios based on at least one of: a number of pieces of deburring media having a first condition, a number of pieces of deburring media having a second condition different than the first condition, and a total number of pieces of deburring media.

5. The apparatus of claim 1, wherein the graphical user interface comprises:
    the at least one image of the multiple pieces of deburring media;
    multiple controls configured to receive user input in order to identify the at least one image to be analyzed; and
    results of analyzing the at least one image, the results including the conditions of the multiple pieces of deburring media, the overall condition of the deburring media, and the notification.

6. The apparatus of claim 1, wherein the at least one processor is further configured to predict at least one of:
    a future overall condition of the deburring media in the vibration deburring machine;
    a time at which additional deburring media should be added to the vibration deburring machine; and
    a time when preventative maintenance should occur for the vibration deburring machine.

7. The apparatus of claim 1, further comprising:
    an interface configured to receive the at least one image from a fixed or portable imaging system.

8. A method comprising:
    obtaining at least one image of multiple pieces of deburring media used in a vibration deburring machine;
    analyzing the at least one image to determine a condition of each of the multiple pieces of deburring media;
    determining an overall condition of the deburring media; and
    generating a graphical user interface containing a notification based on at least one of: the conditions of the multiple pieces of deburring media and the overall condition of the deburring media.

9. The method of claim 8, wherein analyzing the at least one image to determine the condition of each of the multiple pieces of deburring media comprises:
    performing pattern recognition to compare shapes and sizes of the multiple pieces of deburring media to shapes and sizes of deburring media having known conditions; and
    determining which of the deburring media having a specific known condition is most similar to each of the multiple pieces of deburring media.

10. The method of claim 8, wherein analyzing the at least one image to determine the condition of each of the multiple pieces of deburring media comprises:
    using a trained machine learning model to classify each of the multiple pieces of deburring media as having a specific condition.

11. The method of claim 8, wherein determining the overall condition of the deburring media comprises:
    determining one or more ratios based on at least one of:
        a number of pieces of deburring media having a first condition, a number of pieces of deburring media having a second condition different than the first condition, and a total number of pieces of deburring media.

12. The method of claim 8, wherein the graphical user interface comprises:
    the at least one image of the multiple pieces of deburring media;
    multiple controls configured to receive user input in order to identify the at least one image to be analyzed; and
    results of analyzing the at least one image, the results including the conditions of the multiple pieces of deburring media, the overall condition of the deburring media, and the notification.

13. The method of claim 8, further comprising:
predicting at least one of:
- a future overall condition of the deburring media in the vibration deburring machine;
- a time at which additional deburring media should be added to the vibration deburring machine; and
- a time when preventative maintenance should occur for the vibration deburring machine.

14. The method of claim 8, further comprising:
receiving the at least one image from a fixed or portable imaging system.

15. A non-transitory computer readable medium containing instructions that when executed cause at least one processor to:
- obtain at least one image of multiple pieces of deburring media used in a vibration deburring machine;
- analyze the at least one image to determine a condition of each of the multiple pieces of deburring media;
- determine an overall condition of the deburring media; and
- generate a graphical user interface containing a notification based on at least one of: the conditions of the multiple pieces of deburring media and the overall condition of the deburring media.

16. The non-transitory computer readable medium of claim 15, wherein the instructions that cause the at least one processor to analyze the at least one image to determine the condition of each of the multiple pieces of deburring media comprise:
instructions that when executed cause the at least one processor to:
- perform pattern recognition to compare shapes and sizes of the multiple pieces of deburring media to shapes and sizes of deburring media having known conditions; and
- determine which of the deburring media having a specific known condition is most similar to each of the multiple pieces of deburring media.

17. The non-transitory computer readable medium of claim 15, wherein the instructions that cause the at least one processor to analyze the at least one image to determine the condition of each of the multiple pieces of deburring media comprise:
instructions that when executed cause the at least one processor to use a trained machine learning model to classify each of the multiple pieces of deburring media as having a specific condition.

18. The non-transitory computer readable medium of claim 15, wherein the instructions that cause the at least one processor to determine the overall condition of the deburring media comprise:
instructions that when executed cause the at least one processor to determine one or more ratios based on at least one of: a number of pieces of deburring media having a first condition, a number of pieces of deburring media having a second condition different than the first condition, and a total number of pieces of deburring media.

19. The non-transitory computer readable medium of claim 15, wherein the graphical user interface comprises:
- the at least one image of the multiple pieces of deburring media;
- multiple controls configured to receive user input in order to identify the at least one image to be analyzed; and
- results of analyzing the at least one image, the results including the conditions of the multiple pieces of deburring media, the overall condition of the deburring media, and the notification.

20. The non-transitory computer readable medium of claim 15, further containing instructions that when executed cause the at least one processor to predict at least one of:
- a future overall condition of the deburring media in the vibration deburring machine;
- a time at which additional deburring media should be added to the vibration deburring machine; and
- a time when preventative maintenance should occur for the vibration deburring machine.

\* \* \* \* \*